United States Patent

Giegold

[11] Patent Number: 6,002,973
[45] Date of Patent: Dec. 14, 1999

[54] PROCESS FOR CHANGING AN ELECTRONIC MEMORY FOR USE-RELATED DATA OF A VEHICLE

[75] Inventor: Juergen Giegold, Munich, Germany

[73] Assignee: Bayerische Motoren Werke Aktiengesellschaft, Munich, Germany

[21] Appl. No.: 08/876,809

[22] Filed: Jun. 17, 1997

[30] Foreign Application Priority Data

Jun. 17, 1996 [DE] Germany ............................ 196 24 041

[51] Int. Cl.$^6$ ................................................. G06F 7/00
[52] U.S. Cl. ..................... 701/35; 711/2; 711/202; 711/114; 180/177; 180/179; 345/422; 369/47; 369/84
[58] Field of Search ............................. 701/35; 180/177, 180/179; 711/2, 202, 114; 455/161.3; 369/47, 84; 345/422

[56] References Cited

U.S. PATENT DOCUMENTS

| 5,774,434 | 6/1998 | Arataki et al. | 369/47 |
| 5,790,499 | 8/1998 | Itho | 369/84 |
| 5,812,138 | 9/1998 | Devic | 345/422 |
| 5,813,025 | 9/1998 | Murphy et al. | 711/114 |

FOREIGN PATENT DOCUMENTS

| 0 638 877 | 2/1995 | European Pat. Off. |
| 38 28 725 | 4/1989 | Germany . |
| 43 01 038 | 7/1994 | Germany . |
| 2273564 | 6/1994 | United Kingdom . |
| WO 96/10807 | 4/1996 | WIPO . |

OTHER PUBLICATIONS

Japanese Abstract No. 57–148211, vol. 006, No. 252, Sep. 13, 1982.
Japanese Abstract No. 58–191921, vol. 008, No. 038, Nov. 9, 1983.

Primary Examiner—William A. Cuchlinski, Jr.
Assistant Examiner—Olga Hernandez
Attorney, Agent, or Firm—Evenson, McKeown, Edwards & Lenahan, PLLC

[57] ABSTRACT

In the case of a process for changing an electronic memory for use-related data of a vehicle, the changed new data and the old data maintained in the memory are sent to a comparator, in which case the comparator permits the taking-over or acceptance of the new data into the memory only if the new data have changed in comparison to the old data in a manner which conforms with the use of the data.

8 Claims, 1 Drawing Sheet

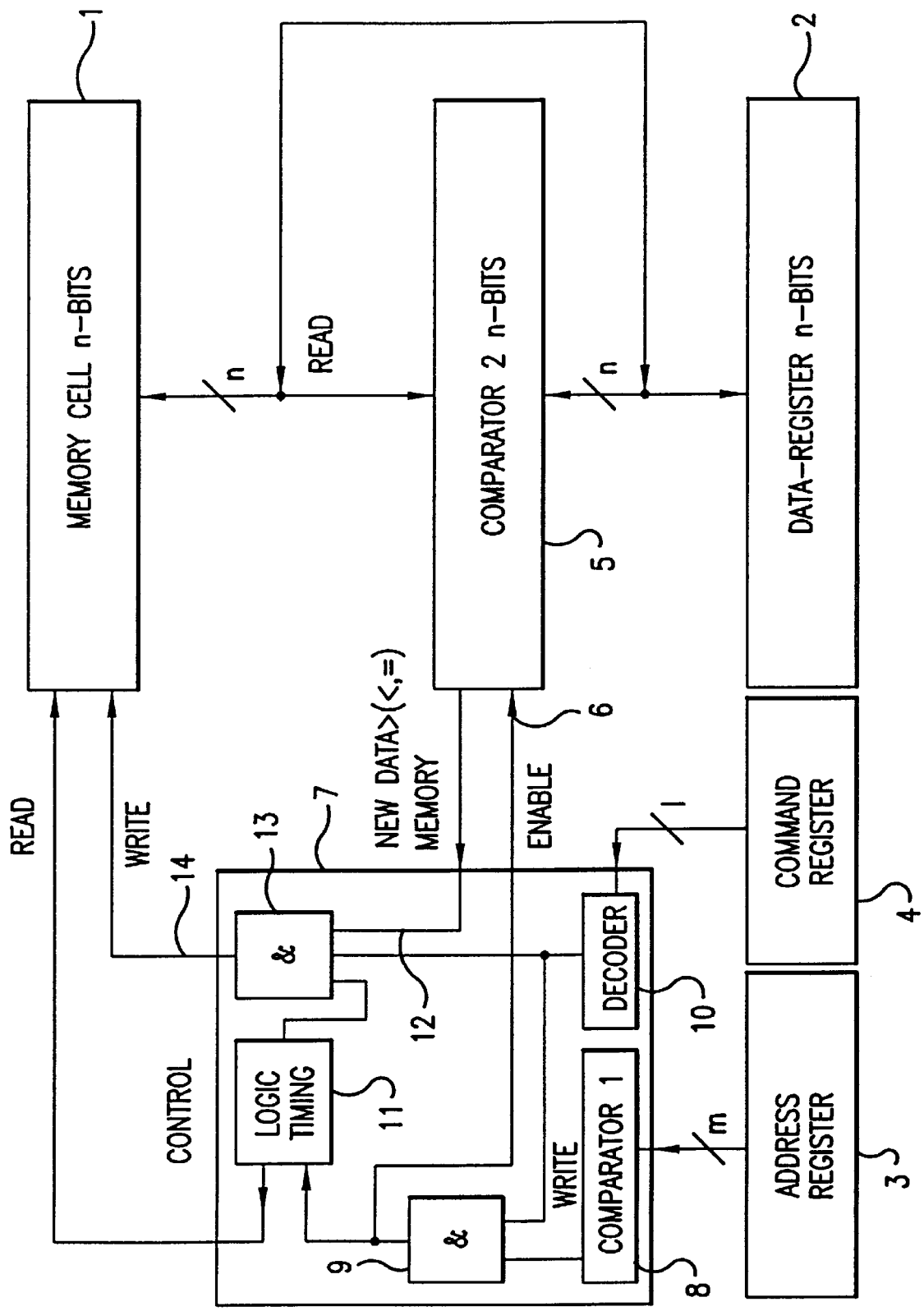

PROCESS FOR CHANGING AN ELECTRONIC MEMORY FOR USE-RELATED DATA OF A VEHICLE

BACKGROUND AND SUMMARY OF THE INVENTION

This application claims the priority of German Application No. 196 24 041.7, the disclosure of which is expressly incorporated by reference herein.

In modern vehicles, a data-receiving write and read memory stores not only the parameters required for the vehicle variants and the country variants but also documentary data, such as the total mileage driven as well as service data. By means of special, high-expenditure methods, such as the redundant filing of the data also in other control units as well as by coding and a software write protection, these data are made as inaccessible as possible so that a manipulation of these data is made more difficult.

Although the required technical expenditures with respect to a manipulation of this type of memory have risen in comparison to changing the previously customary total mileage counter (referred to in the following as "GWSZ"). In a mechanical roller-type counter, the above-mentioned conventional measures have all not been able to prevent a manipulation of the content of GWSZ and of other documentary data.

There is therefore needed a process of the above-mentioned type which offers increased protection against a manipulation of the memory.

This need is met according to the present invention by a process for changing an electronic memory for use-related data of a vehicle. The changed new data and the old data maintained in the memory are sent to a comparator. The comparator will permit the taking-over of the new data into the memory only if the new data are changed with respect to the old data in a manner conforming with the use.

The comparator is now a part of a logic unit which compares the new and the old data with one another and will permit an overwriting of the memory with the new data only if the difference of the two satisfies defined plausibility criteria.

If the documentary data are, for example, the overall operating time of the vehicle, the new data can be taken over only if they correspond to a fairly long total operating time. However, not only the type, e.g. in this case, the increase of the total operating time, but also the extent by which the data are changed falls into the scope of the present invention. The change must be plausible. This prevents making an accidental change of data which does not correspond to the actual conditions. For example, an unintentional doubling of the total operating time can be excluded in this manner.

In the case of the GWSZ (total mileage counter), the invention is represented as follows.

The new data are taken over and used for overwriting the old data only if the new data correspond to an increased running performance of the vehicle and if they differ from the old data by a predetermined value. This value can be used as the upper limit and correspond, for example, to a change of the running distance by two kilometers.

Other objects, advantages and novel features of the present invention will become apparent from the following detailed description of the invention when considered in conjunction with the accompanying drawings.

BRIEF DESCRIPTION OF THE DRAWINGS

The single FIGURE is a block diagram for a circuit for carrying out the process according to the invention.

DETAILED DESCRIPTION OF THE DRAWINGS

Referring to the FIGURE, in the control unit of a vehicle, the total mileage, or total number of kilometers, is to be stored and is to be altered in the case of a change. For this purpose, a memory 1 is constructed as an n-BIT storage cell with, for example, n=24. The content of the memory 1 corresponds to the previous running performance of the vehicle.

If the running performance is now increased, a microprocessor, which is not shown, will supply a datum which corresponds to the new mileage. This datum is fed into a data register 2. Simultaneously, the address of the memory 1 is fed into an address register 3 and a write command is given into a command register 4. Before the write command is implemented, the new data existing in the temporary memory 2 are compared with the old data existing in the memory 1. For this purpose, a comparator 5 is used which reads out the content of the memories 1 and 2. This takes place on the basis of a corresponding command by way of a control line 6 which connects the comparator 5 with a control and logic unit 7. Another comparator 8 is situated in unit 7 and receives the address of the memory 1 present in the address register 3 and compares it with given addresses. These given addresses are the addresses of memories which contain documentary data of the vehicle, in this case, the mileage, and therefore the address of the memory 1. By way of an AND-element 9, the comparator 8 sends the control command to the comparator 5. The output of a decoder 10 is connected to the AND-element 9, which decoder 10 receives the write command from the command register 4 and decodes it.

Simultaneously with the control command for the comparator 5, the AND-element 9 triggers a timing element 11 which sends a read command to the memory 1. The memory 1 sends its content to the comparator 5.

If, during the comparison of the old and the new data in the comparator 5, it is found that the new data are plausible; that is, that they differ from the old data because of a maximal increase of the running performance by, for example, 2 km, but the new data are at least higher, the comparator 5 will, by way of a line 12, send a signal to an AND-element 13 which is connected with the output of the timing element 11 and of the decoder 10. The output of the AND-element 13 is connected with the write input 14 the memory 1. The memory 1 will now take over, i.e. accept, the new data. The new total running performance is therefore stored. If the content of the memory 1 now is to be altered in a plausible manner; for example, is to be replaced by a content which corresponds to a lower running performance, the sequence will correspond with the above-described sequence until the point in time at which, a signal is emitted by way of the line 12 from the comparator 5 to the AND-element 13. If the change is not plausible; that is, it does not correspond to an increase of the running performance by a limited value, the signal is not emitted to line 12. As a result, the AND-element 13 does not supply the write command to the write input 14 the memory 1. The new data (which are first present in the temporary memory 2) will now not be accepted in the memory 1. The content of the memory 1 therefore remains unchanged.

This process ensures a high level of protection against a manipulation, although unintended, of the memory 1 and thus of documentary data of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for changing an electronic memory for storing use-related data of a vehicle, the process comprising the steps of:

sending changed new data to a comparator;

sending old use-related data of the vehicle to the comparator, the old data being maintained in the electronic memory; and operating the comparator to permit an overwriting of the changed new data into the electronic memory only if the changed new data are changed with respect to the old data in a manner conforming with a prescribed use.

2. The process according to claim 1, further comprising the step of updating the old data relating to a running performance use of the vehicle only if the changed new data maximally differs from the old data via a predetermined differential value.

3. The process according to claim 1, further comprising the step of updating the old data relating to a running performance of the vehicle only if the changed new data corresponds to a running performance use which is larger in comparison to the old data.

4. The process according to claim 2, further comprising the step of updating the old data relating to the running performance use of the vehicle only if the changed new data corresponds to a running performance which is larger in comparison to the old data.

5. A circuit for changing a memory, comprising:

a control unit coupled to said memory, said control unit receiving a memory address signal and a command signal;

a new data register which receives new data corresponding to a running performance of the vehicle;

a comparator coupled to said new data register and said memory, said comparator being enabled via a signal from said control unit to compare said new data stored in said new data register with old data stored in said memory; and wherein said control unit writes new data into said memory only if said new data are changed with respect to said old data in a manner conforming with said running performance of the vehicle.

6. The circuit according to claim 5, wherein said manner conforms with the running performance of the vehicle only if said new data maximally differs from said old data via a predetermined differential value.

7. The circuit according to claim 6, wherein said predetermined differential value is such that said new data is larger in comparison to said old data.

8. A circuit for changing a memory, comprising:

a control unit coupled to said memory, said control unit receiving a memory address signal and a command signal;

a new data register which receives new use-related data of the vehicle;

a comparator coupled to said new data register and said memory, said comparator being enabled via a signal from said control unit to compare said new data stored in said new data register with old use-related data of the vehicle stored in said memory; and wherein said control unit writes new data into said memory only if said new data are changed with respect to said old data in a manner conforming with a prescribed use.

* * * * *